Jan. 14, 1947.    R. BORDEN    2,414,083
PHOTOGRAPHIC APPARATUS
Filed April 1, 1942    2 Sheets-Sheet 2
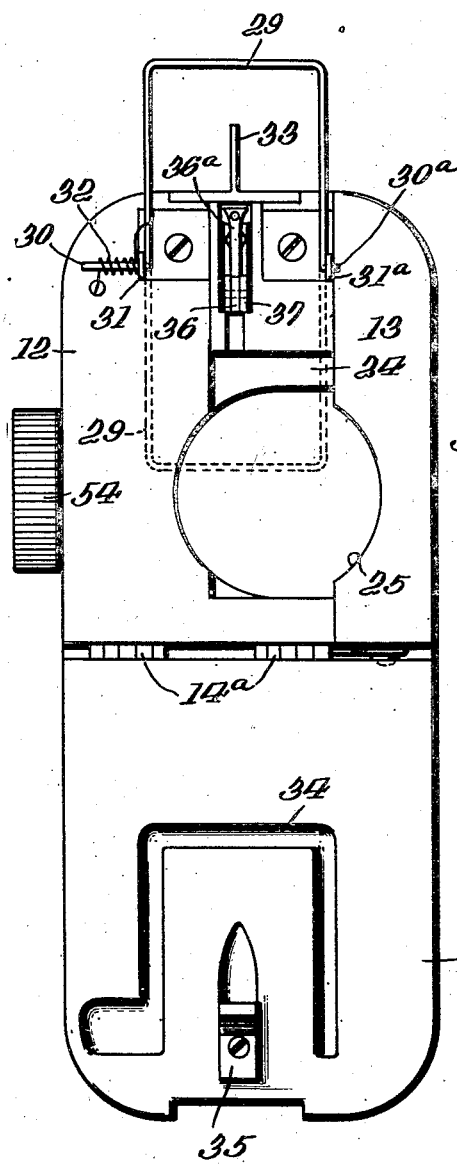
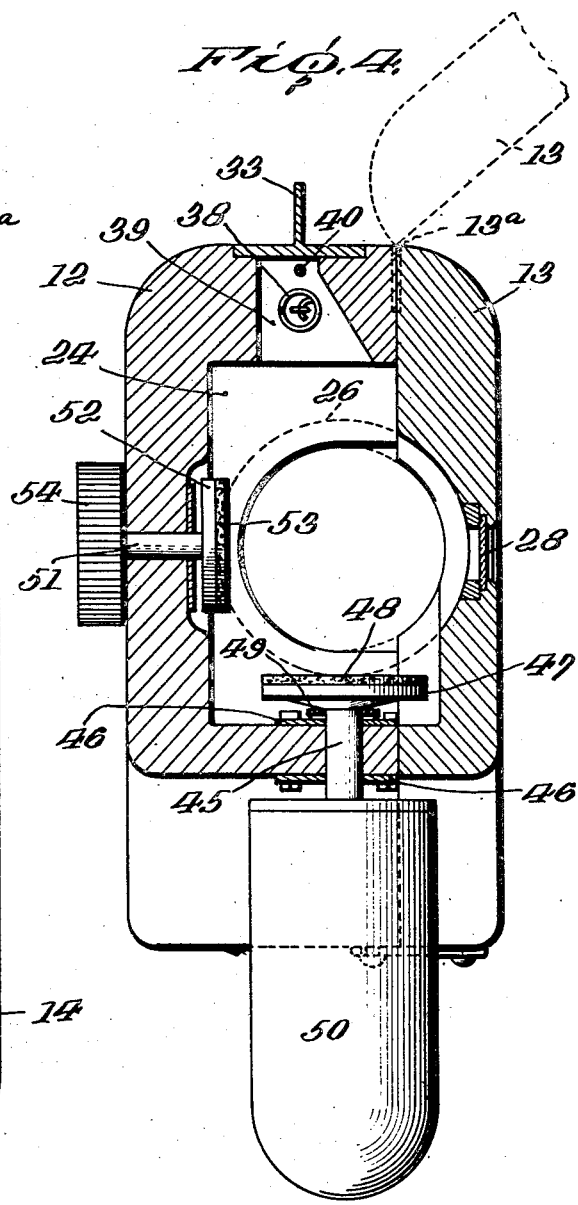
INVENTOR
Richard Borden
By Charles L. Sturtevant
ATTORNEY Patented Jan. 14, 1947

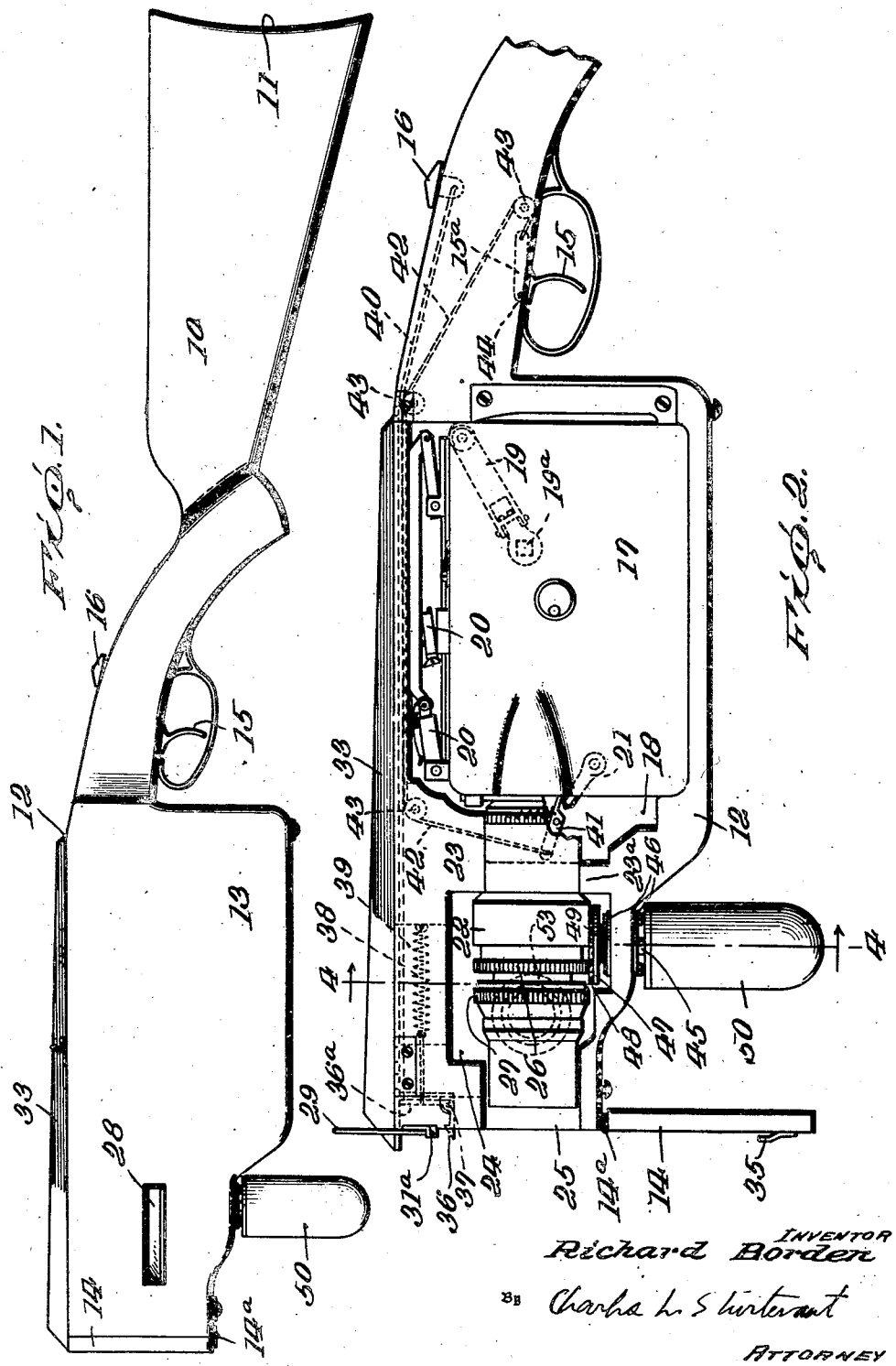

2,414,083

UNITED STATES PATENT OFFICE 2,414,083

PHOTOGRAPHIC APPARATUS

Richard Borden, Milton, Mass.

Application April 1, 1942, Serial No. 437,246

14 Claims. (Cl. 88—16)

The present invention relates to new and useful improvements in a photographic apparatus, and more particularly to improvements in an associated camera and supporting structure having the various parts so combined as to greatly facilitate operation, manipulation and control of the camera.

According to the present invention, the supporting structure generally simulates a shotgun with the forward part in the form of a casing to inclose the camera and with the rear part in the form of a gun stock having a shoulder rest. The casing may be suitably shaped to inclose various types of still or moving picture cameras, and the entire assembly is one which can be conveniently and readily manipulated to follow rapidly moving objects. When using a still camera, the apparatus may be employed for taking snap shots of birds, animals or other objects, either in motion or at rest. However, the apparatus of the present invention is perhaps more useful in taking moving pictures, and any suitable type of moving picture camera may be employed. Those persons accomplished in the use of shotguns and other firearms will find the apparatus particularly easy to manipulate in order to train the camera and obtain difficult angle "shots" of rapidly moving objects. In fact, the entire assembly can be handled as a shotgun so as to permit instant photographing of rapidly moving objects in fast or slow motion where time does not permit preliminary preparation. In this type of photography, the camera must be trained, adjusted and operated within a few seconds and a telephoto lens is essential for satisfactory results in order to picture the moving objects at long and close range. Thus, the camera assembly is of singular importance because of the fact that the arrangement is such as to utilize to the highest degree the training and instincts of an experienced gunner in bringing the camera to focus on a rapidly moving object in the shortest possible time.

The apparatus can be employed for taking moving pictures of game birds, animals, and, in fact, all kinds of rapidly moving objects. The camera can be put to various military uses in picturing the actions of new military devices and equipment, such as aircraft, parachutes and the like, so that the pictures can be used for instructions concerning the manipulation and actions of such devices.

One of the principal objects of the present invention is to provide a camera apparatus of the above type wherein the camera and lens are completely inclosed within the casing, but are at all times under instantaneous control of the operator exteriorly of the casing which is held as a gun to facilitate following of the object.

Another object of the invention is to provide a camera apparatus of the above type wherein an open wire finder is employed in combination with the telephoto lens in order to open the field to rapidly moving objects in a manner which is not practicable with a lens type of finder.

A further object of the invention is to provide for the automatic release of the finder from a housed position within the casing to an operative position upon manipulation of a simulated safety catch on the gun stock.

A still further object of the invention is to provide at the forward part of the casing a supporting hand grip which may be manipulated while supporting the casing for adjusting the focus of the telephoto lens, this being essential at close range and in order to picture objects moving rapidly toward and away from the camera.

The invention still further aims to provide a camera apparatus of the above type wherein the camera motor can be wound from outside of the casing and released exteriorly of the casing by a trigger mechanism so that the camera and lens are under the control of the operator while aiming the casing by the open finder and following the object.

The above and other objects of the invention will in part be obvious and will in part be hereinafter more fully pointed out.

In the accompanying drawings:

Figure 1 is a side elevation of the camera apparatus with the camera and lens inclosed within the casing.

Figure 2 is an enlarged fragmentary side elevation of the camera apparatus, with the hinged side of the casing removed to show the camera and lens and the finder in operative position.

Figure 3 is a further enlarged front elevation of Figure 2.

Figure 4 is an enlarged sectional view taken substantially along the line 4—4 of Figure 2.

Referring more in detail to the accompanying drawings, the camera support has the general appearance of a gun and includes a stock portion 10 having a shoulder rest 11 at the rear end thereof. The forward part of the support is in the form of a casing 12 which has a side closure 13 hinged thereto, as at 13a, and a front closure flap 14 hinged thereto, as at 14a. The intermediate or breech area of the support carries a trigger 15 and a simulated safety catch 16, the operation and function of which will be hereinafter fully described.

As shown in Figure 2 of the drawings merely for purposes of illustration, a conventional 16 mm. Eastman moving picture camera 17 is mounted within the casing 12. Thus, the casing 12 is provided with an internal chamber 18 which is shaped to receive the camera 17, but it is to be clearly understood that the shape of the chamber may be altered to accommodate any suitable type of camera. Similarly, the inner surface of the side closure 13 is shaped to accommodate the camera and the lens when closed.

The camera 17 is of a conventional type including a spring motor furnishing power through suitable gears to a film advancing mechanism (not shown) and a winding shaft extends through the camera casing and carries a rectangular end 19a which is adapted to receive a winding key through an opening in the casing 12. As shown in the drawings (Figure 2), a winding lever 19 of the type substantially shown in the Wittel patent, No. 1,595,277, is placed in an inoperative position when the camera is employed according to the present invention. Similarly, the lens type of finder, designated generally by the numeral 20, is folded down in an inoperative position within the casing 12. A lever 21 is carried by the camera and depression of this lever serves to actuate the camera and film mechanism.

The telephoto focusing device 22 is also conventional and may be of the type substantially shown in the Scott patent, No. 2,019,735, and is suitably mounted on the camera 17. The interior of the casing 12 is shaped to provide supporting surfaces 23, 23a for the lens and to provide a forward chamber 24 through which the lens extends toward the front opening 25 in the casing 12. The knurled ring 26 on the telephoto focusing device is for the purpose of adjustment, as the object comes within a predetermined relatively short range. However, with the lens set at infinity no adjustment is necessary beyond the short range. The knurled ring 27 is for the purpose of adjusting the diaphragm mechanism of the lens. The setting of the telephoto lens may be viewed through the window 28 in the closure 13; or, if desired, an externally visible and movable member, similarly marked and geared to move in unison with the adjustment of the telephoto lens, may be provided.

An open wire finder 29 has the legs thereof turned outwardly, as at 30, 30a, and pivotally mounted in apertured bracket members 31, 31a, respectively, at the upper forward end of the casing 12. A coil spring 32 is wound around the outwardly turned leg portion 30 and has the ends thereof secured to the front of the casing and to the corresponding leg so as to normally tend to rotate the finder to its elevated operative position, as shown in Figures 2 and 3. In this position of the finder, it will be seen that the vertical rib 33 is centrally disposed with respect thereto. This rib extends along the top of the casing and gradually tapers downwardly from the front end toward the rear end and thus serves as a sighting rib in conjunction with the finder 29. The length of the stock portion and casing serves to locate the intermediate portion behind the rear end of the rib 33, and this portion provides a cheek rest which automatically positions the operator's eye a uniform distance from the finder 29.

The inner surface of the front closure flap 14 is provided with channels or grooves 34 to house the spring 32 and the finder 29 when rotated to its inoperative position within the casing, as shown by the dotted line position of Figure 3. Thus, there is no binding or bending of the finder when the flap 14 is closed over the end of the casing. The flap 14 is maintained in its closed position by engagement between an outwardly extending keeper element 35 which is carried thereby, and a latch 36 which is pivotally mounted, as at 37, near the forward end of the casing. Thus, the finder is held in its inoperative position when the flap 14 is closed. The latch 36 is provided with a vertical arm 36a to which one end of a tension spring 38 is suitably connected. The spring 38 is disposed within a recessed portion 39 in the forward part of the casing and has the opposite end thereof secured to the casing. In this manner, the latch 36 is normally held in elevated position for engaging the keeper 35.

The free end of the latch arm 36a is connected to a substantially rigid rod 40 which extends rearwardly within the top of the casing and is connected to the safety catch 16 which is slidable along a slot in the breech area. Forward shifting of the catch 16 will effect downward movement of the latch 36 about the pivot 37 so as to release the latch from the keeper 35 and permit the flap 14 to open. Thus, when the latch is released, the spring 32 will force the finder 29 outwardly in its movement to operative position and this will effect automatic opening of the flap 14.

A lever 41 is pivoted intermediate the ends thereof to the inner surface of the casing within the chamber 18 and is disposed in advance of the camera so that one end thereof engages the lever 21 which actuates the camera mechanism. The opposite end of the lever 41 is connected to a cord 42 which is trained over pulleys 43 and is connected to the arm 15a of the trigger 15 which is pivoted at 44 to the support. Thus, rearward pulling of the trigger 15 will take up on the cord 42 and effect rotation of the lever 41 which, in turn, will depress the lever 21 to actuate the camera mechanism.

The adjusting ring 26 of the telephoto lens may be turned from outside the casing and for this purpose a shaft 45 extends through bearing plates 46 secured to the inner and outer surfaces of the bottom of the forward part of the casing. The inner end of the shaft 45 carries a disc 47 and the disc carries a friction pad 48 or other suitable means for engaging the knurled ring 26. A leaf spring 49 engages the bottom of the disc 47 and maintains the pad in contact with the ring 26. The outer end of the shaft 45 carries an enlarged handle member 50 by which the shaft 45 can be rotated. In using the camera, this handle 50 also serves as a gripping member by which the forward part of the assembly is supported. Another shaft 51 extends through the casing wall opposite from the closure 13 and carries at the inner end thereof a disc 52 on which a friction pad 53 or the like is disposed. A finger wheel 54 is carried by the outer end of the shaft 51 for operating the same. Inward shifting of the shaft 51 will cause engagement between the pad 53 and the knurled ring 27 so that this ring can also be exteriorly adjusted without opening the casing.

From the foregoing description, it will be seen that the present invention provides a camera assembly which may be easily operated and controlled so as to facilitate the picturing of rapidly moving objects. The assembly is one which can be manipulated in the manner of a gun, in that the rear end 11 of the stock portion is placed against the shoulder of the operator with the outstretched hand grasping the depending handle member 50. The other hand is free to control the catch 16 and the trigger 15. By grasping the handle 50, the operator is able to conveniently support the forward part of the assembly and at the same time have complete control of the focus adjustment of the telephoto lens when necessary, that is, when the object comes within a predetermined close range. The operator can judge the proper amount of turning of the handle 50 to correspond to the desired rotation of the ring 26. However, any suitable form of externally visible means, graduated according to the telephoto lens, may be employed, if desired. The operator also has complete control of the operation of the camera mechanism by manipulation of the trigger 15 and the front flap and finder can be rapidly and automatically released by forward shifting of the catch member 16.

It will be readily appreciated, therefore, that the entire camera and lens mechanism, while inclosed within the casing, are at the same time controlled exteriorly of the casing by the operator. When not in use, the finder is held within the casing by the front flap so as to prevent the access of dirt or the like to the lens and camera mechanism.

As previously pointed out, the camera assembly is arranged so that its manipulation and operation are substantially identical with the operation of a shotgun, thus facilitating its use by an experienced gunner in photographing rapidly moving objects.

While one form of the invention has been shown for purposes of illustration, it is to be clearly understood that various changes in the details of construction and arrangement of parts may be made without departing from the scope of the invention as set forth in the appended claims.

I claim:

1. In a photographic apparatus, a portable support in the form of a gun having a casing at the forward part thereof, a camera inclosed within the casing, a telephoto lens associated with the camera and inclosed within the casing, a closure member at the front of said casing, an open sighting device carried by the support and adapted to be held within the casing in inoperative position by said closure member, means including a slidable member simulating a safety catch on the support for releasing the closure member to expose the lens and permitting the sighting device to move to an operative position, and means for operating the camera.

2. In a photographic apparatus, a portable support in the form of a casing, a camera inclosed within said casing, a telephoto lens associated with the camera and inclosed within said casing, a closure member connected to the front of the casing for closing the said casing and adapted to be opened to expose the lens, an open sighting device connected to the front of the casing and shiftable to an inoperative position within the casing and held therein by said closure member when closed, spring means normally forcing said sighting device to an operative position outside of said casing, and manually operable means for releasing said closure member and permitting opening thereof under the influence of said sighting device while moving to its operative position.

3. In a photographic apparatus, a portable support in the form of a casing having an open front end, a camera inclosed within said casing, a telephoto lens associated with the camera and inclosed within the casing, an open wire finder pivoted at the front of the casing for movement between an operative position extending above the casing and an inoperative position disposed within the casing, spring means normally forcing said finder to an operative position, a closure member hinged to the casing for closing the front end thereof and maintaining the finder in its inoperative position within the casing, latch means for holding the closure member in closed position, and means operable exteriorly of the casing for releasing the latch means to permit opening of the closure member as the finder moves to its operative position.

4. In a photographic apparatus, a portable support in the form of a gun having a shoulder rest, an intermediate breech area and a forward casing having an open front end; a camera inclosed within the casing, a telephoto lens associated with the camera and inclosed within the casing and adapted to be exposed through the front end thereof, a sighting device disposed on and adapted for sighting along said casing, means including a trigger mechanism in the breech area for operating the camera, and means including a depending handle at the forward part of the casing for adjusting the focus of the telephoto lens within a predetermined close range and said handle serving as a means by which the operator can support the forward part of the apparatus.

5. In a photographic apparatus, a portable support in the form of a gun having a casing at the forward part thereof, a moving picture camera inclosed within the casing, a telephoto lens associated with the camera and inclosed within the casing, a closure member for the front end of the casing and adapted to be opened to expose the lens, a sighting device carried by the support to facilitate the following of rapidly moving objects, a trigger mechanism for operating the camera, and means extending exteriorly of the front of the casing and adapted to be grasped by one hand of the operator for adjusting the focus of the telephoto lens within a predetermined close range and also serving as a means for supporting the forward part of the apparatus.

6. In a photographic apparatus, a support in the form of a gun having a casing with an open front end at the forward part thereof, a moving picture camera inclosed within the casing, a telephoto lens associated with the camera and inclosed within the casing and having a knurled focus adjusting ring, a closure member for the open end of the casing and adapted to be opened to expose the lens, an open sighting device to facilitate the following of rapidly moving objects, a trigger mechanism for operating the camera, a rotatable member within the casing and engaging said ring, a shaft connected to said rotatable member and extending exteriorly through the under side of the casing, and a handle member carried by the shaft and adapted to be grasped by one hand of the operator for supporting the forward part of the apparatus and for adjusting the focus of the telephoto lens within a predetermined close range.

7. In a photographic apparatus, as claimed in claim 6, wherein spring means are provided for maintaining said rotatable member in contact with said focus adjusting ring.

8. In a photographic apparatus, a portable support in the form of a gun having a shoulder rest, an intermediate breech area and a forward casing having a front opening with a closure for said opening; a camera inclosed within said casing, a telephoto lens associated with the camera and inclosed within said casing in line with said front opening, a trigger mechanism in the breech area for operating the camera, an open sighting device normally housed in said casing when the closure is in position covering said opening, spring means tending to open said closure and to shift said sighting device to its operative position, means for controlling action of said spring means, and means extending exteriorly of said casing for adjusting the focus of the telephoto lens when required.

9. In a photographic apparatus, the combination of a camera, supporting means for the camera in the form of a shoulder gun having a shoulder rest and a barrel portion in the form of a casing for said camera, a telephoto lens associated with the camera and inclosed within said casing, a sighting device along the top of said casing to facilitate the following of rapidly moving objects, handle means extending exteriorly of said casing adjacent the forward end thereof for supporting the forward part of the apparatus, and means located between the casing and the shoulder rest for operating the camera.

10. A photographic apparatus as claimed in claim 9, wherein the telephoto lens is adjustable and the handle means is movable and connected to the lens by means adapted to effect adjustment of the lens upon movement of the handle.

11. In a photographic apparatus, the combination of a camera, supporting means for the camera in the form of a shoulder gun having a shoulder rest, an intermediate breech area, and a barrel portion in the form of a casing for said camera; a telephoto lens associated with the camera and inclosed within said casing, a sighting device connected at the forward end of said casing for movement between a sighting position disposed exteriorly above said casing and an inoperative position housed within said casing, means including a movable member located in the breech area and simulating a safety catch for initiating movement of said sighting device to sighting position, and means including a trigger mechanism located in the breech area for operating the camera.

12. A photographic apparatus as claimed in claim 11, wherein the casing is provided with a front closure member contacting the sighting device in its housed position and adapted to be moved thereby to open position exposing the lens as the sighting device is moved to sighting position.

13. A photographic apparatus as claimed in claim 11, wherein a movable handle depends from the forward part of the casing and wherein there is provided means responsive to movement of the handle for adjusting the telephoto lens.

14. In a photographic apparatus adapted to be carried in picture-taking position by the operator, the combination of a camera, supporting means for the camera in the form of a shoulder gun having a barrel portion in the form of a casing for the camera and a shoulder rest whereby to facilitate training of the camera by shoulder and arm support of the operator, a telephoto lens operatively associated with the camera, a sighting device adapted for sighting along the barrel portion to further facilitate the following of rapidly moving objects, means located between the barrel portion and the shoulder rest for operating the camera, and means extending downwardly at the forward end of the barrel portion and adapted to be manipulated by the operator for adjusting the focus of the telephoto lens when required and while still supporting the forward part of the apparatus.

RICHARD BORDEN.